Patented May 30, 1950

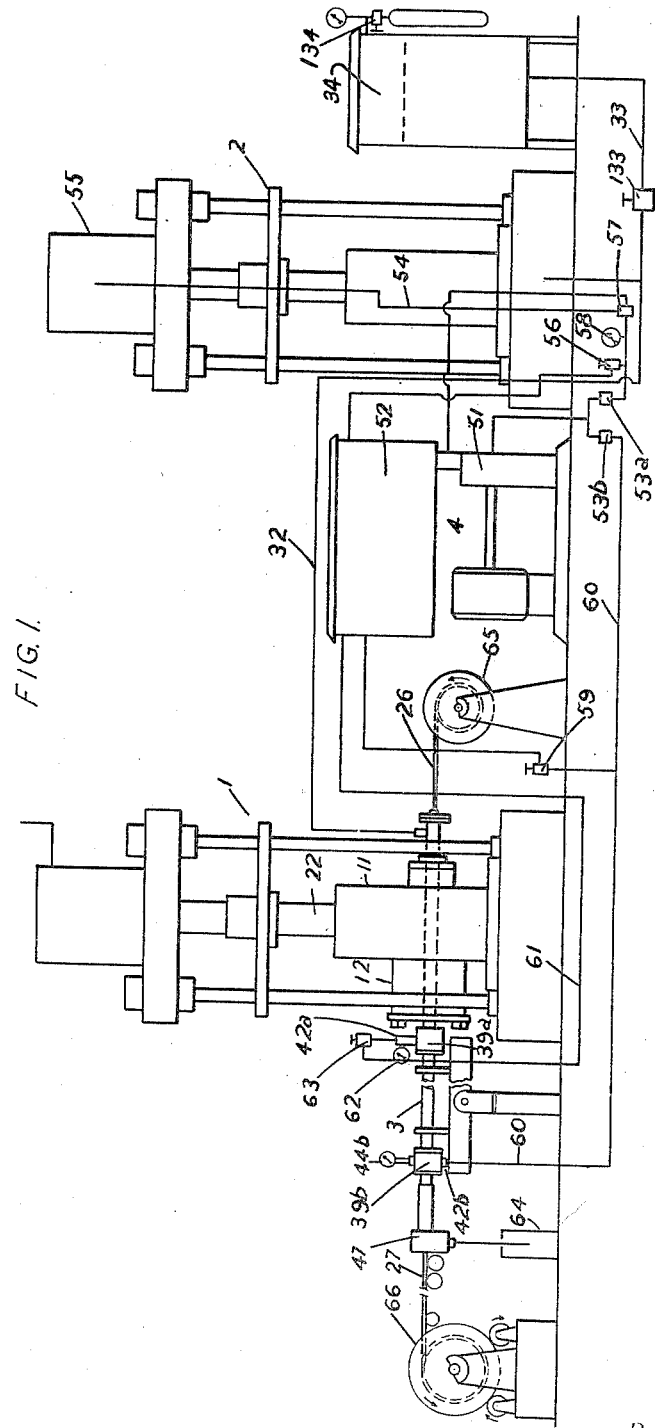

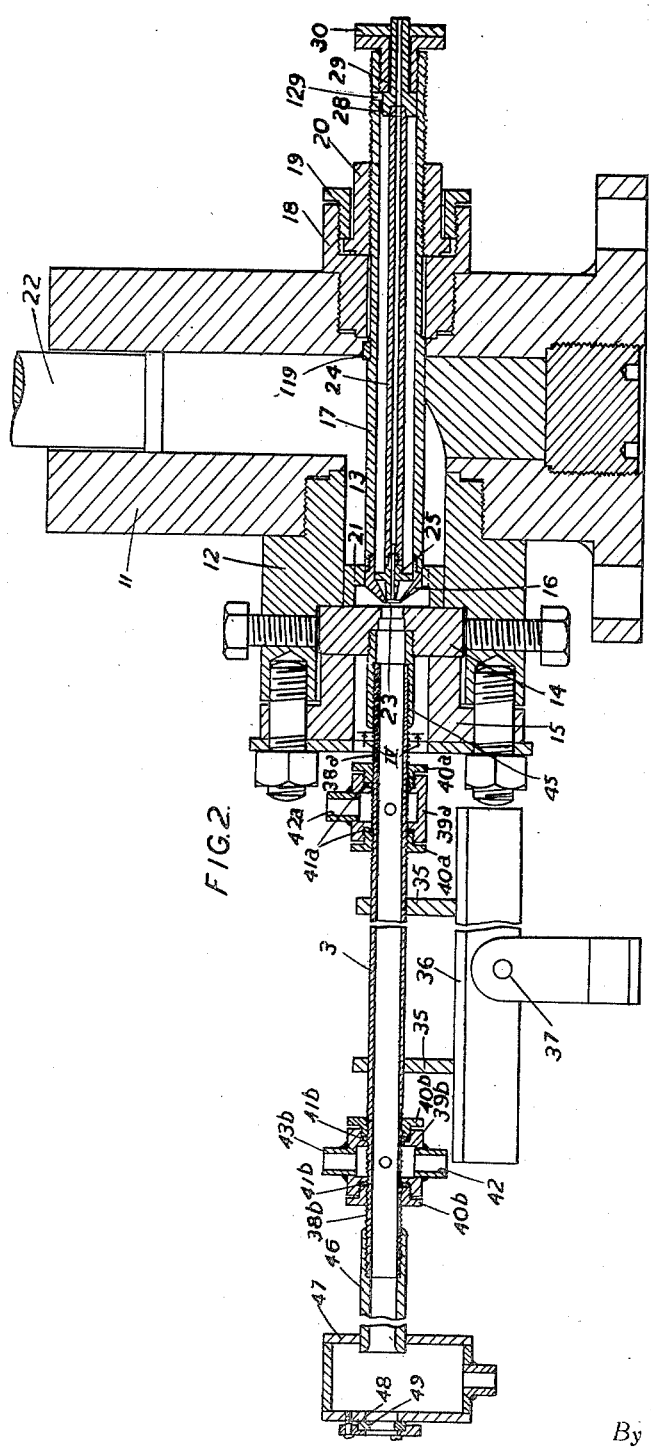

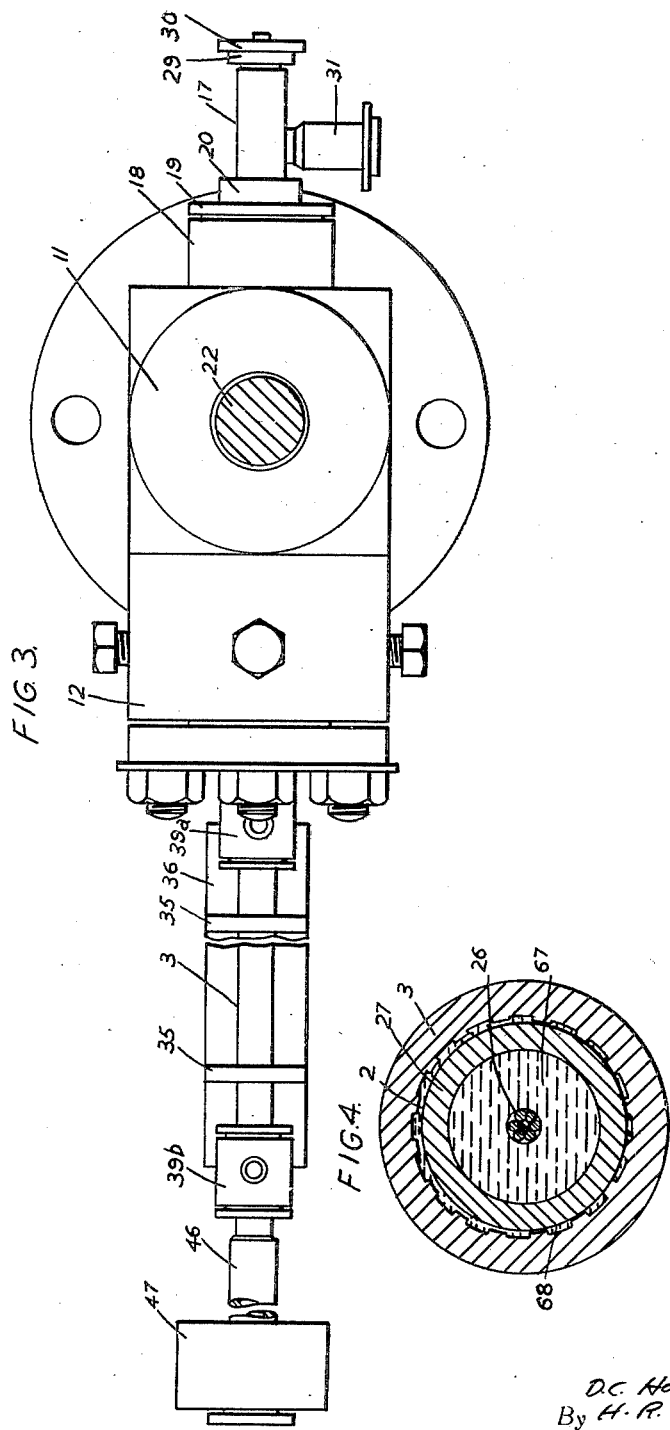

2,509,432

UNITED STATES PATENT OFFICE 2,509,432

METHOD AND APPARATUS FOR MANUFACTURE OF INSULATED WIRE AND CABLES FOR ELECTRICAL PURPOSES

Douglas Charles Hancock, North Wembley, and Hermann Richard Lorch, London, England, assignors to British Insulated Callender's Cables Limited, London, England, a British company Application February 15, 1947, Serial No. 728,880
In Great Britain March 7, 1946

7 Claims. (Cl. 18—13)

This invention is concerned with the manufacture of insulated wire and cables of the kind in which the insulating material is a thermoplastic substance. It relates particularly to the case where insulating material is applied in a substantial radial thickness. The method of manufacture provides against disadvantageous effects which may result from shrinkage of material during cooling and against the existence of bubbles of gas in the conductor covering of a size such as to affect seriously or even appreciably the electrical properties of the covering.

In the improved method of manufacture of insulated wire and cables we apply features of the technique of injection moulding of thermoplastic materials. In the injection moulding of such material, the moulding material, in a fluid state and under high pressure is injected through an injection orifice or nozzle into the mould and allowed to set under the high injection pressure before being ejected from the mould. In accordance with the present invention the insulated covering is applied to the conductor by an injection moulding process of a continuous nature. In this process the conductor is caused to travel forward and as it does so is enclosed in a tubular mould of which the wall travels forward continually at the speed of the conductor. The tubular mould is a metal tube which is continuously formed about the wire by an extrusion process. As the mould travels forward, it is filled with the covering material in a fluid state and under high pressure by a continuous injection moulding process. The mould is supported externally by surrounding it for an appropriate distance from its formation point with a fluid medium under atmospheric pressure and heat is abstracted from the pressure supported length of mould to cool and set the injected moulded material therein. An appropriate distance is the distance between the metal extrusion die and the point at which the injected fluid solidifies. In our improved method of manufacture, as the wire and the filled mould move forward, the material in the mould is cooled to its setting point whilst still under the high pressure exerted by the following material. Thus the risk of void formation by shrinkage is reduced by the follow-up movement of fluid material from the hotter parts of the mould and any bubbles of gas which exist in the injected material are reduced in size by compression and maintained under compression whilst the material sets to form a solid dielectric body surrounding the conductor and insulating it.

Most conveniently support to the mould is given by a fluid medium under super-atmospheric pressure within a pressure resistant casing surrounding the mould for an appropriate distance from its formation point.

The extruded metal tube forming the mould may be left on the conductor to form a permanent metal sheath therefor or it may be stripped from the insulated conductor, either immediately it has served its purpose as a mould or subsequently. Where the mould is of a temporary nature it can be designed with sole regard to its functions as a mould. For instance, in some cases it may be thicker than or thinner than it would need to be if it were required to form a sheath for the insulated conductor.

A suitable plant for carrying out the improved method of manufacture includes an extrusion device for the production of metal tubing by extruding plastic metal through an annular extrusion orifice. This device may be a metal extrusion press or a continuous metal extrusion machine. The extrusion orifice is formed, as is usual, by two co-operating dies, an outer die or matrix and an inner die or point. For the purpose of the invention this point is tubular and carried on a tubular point holder which contains an inner point holder located centrally in the outer point holder and apertured for the passage of the conductor to be covered. The inner point holder supports a correspondingly apertured inner point which co-operates with the tubular point to form an annular injection orifice through which the covering material in a fluid state is injected into the clearance between the conductor emerging from the passage through the inner point and the wall of the metal tube extruded around it. Combined with this extrusion press or extrusion machine is some pressure means for the supply of fluid covering material to the interior of the tubular point holder leading to the injection orifice. This pressure means may be of the hydraulic press, the reciprocating or rotary screw type combined with a heating arrangement to ensure that material of the right fluidity and pressure is supplied at the injection orifice.

On the delivery side of the extrusion device is provided the means for supporting an appropriate length of the extruded metal tube externally against the high internal pressure exerted by the insulating material and for abstracting heat from the pressure supported length of mould to cool and set the injection moulded material therein. Preferably this means comprises a pressure-resistant tube which is coupled at one end in a fluid-tight manner to the outer die or matrix of the metal extrusion device and is supplied with fluid under super-atmospheric pressure which serves as a cooling medium causing the injected material to set within a reasonably short distance of the injection moulding point. Preferably the pressure resistant tube is of such a construction that it serves to maintain the extruded metal tube substantially in alignment with the extrusion orifice until the injected material has set. This assists in preventing lateral displacement of the conductor during the setting process.

The choice of the metal for the tubular mould is guided by the properties of the insulating material to be injected into it, there being an appropriate coordination of the temperature of softening of this material with the extrusion temperature of the metal. For instance, where the conductor is to be insulated with polyethylene, an appropriate metal would be lead or a lead alloy since the extrusion temperature for such metal would not be less than the temperature at which polyethylene becomes sufficiently fluid for injection moulding. In the case of an insulating material of which the softening and moulding temperatures are too high for the mould to be of lead or a lead alloy, resort may be had to a mould of aluminium.

To enable the invention to be more fully understood and to be readily put into practice, an example of apparatus for carrying out the improved method of manufacture will now be described in detail and with the aid of the accompanying drawings, wherein Figure 1 is a plant diagram,
Figure 2 is a sectional elevation of the apparatus for injection moulding insulating material on a conductor,
Figure 3 is a plan of the apparatus shown in Figure 2, and
Figure 4 is a cross-section taken on the line IV—IV in Figure 2 but drawn to a larger scale.

The plant shown in the drawings is one that is suitable for the manufacture of a single core cable having a dielectric of a low melting point plastic, such as polyethylene, enclosed in a lead sheath. As is shown in Figure 1, it comprises a lead press 1 for extruding a tube of lead or lead alloy around the conductor as it passes through the press, a second press 2 for forcing liquid plastic into the space between the conductor and the lead tube surrounding it, a cooling tube 3 on the delivery side of the lead press and hydraulic pumping apparatus 4 for supplying the tube 3 with a pressure fluid which serves both to support the extruded tube against the internal pressure of the liquid plastic and to abstract heat from the tube and the injected plastic and bring about a gradual setting of the plastic.

The construction of the lead press 1 is clearly shown in Figures 2 and 3 of the drawings. It consists of a vertical container 11 having axially aligned lateral openings in its cylindrical wall. In one of these is secured a die block 12 having a horizontally extending stepped cylindrical passage 13 the inner and smaller end of which opens into the container and forms the extrusion chamber. In the outer and larger end of the passage 13 is a disc which is centrally apertured to form an outer die or matrix 14 and is held against the step by a tubular die holder 15 secured by studs and nuts to the die block 12. Co-operating with this outer die 14 is an inner die or point 16 carried on the end of a point holder 17 which passes through the other opening in the wall of the container and a point holder support 18 housed in the outer end thereof, to be held in place longitudinally by a locking ring 19 which screws into the point holder support 18 and clamps the inner face of a collar 20 on the point holder against a seating in the support, and angularly by a key 119. At its front end the point and point holder are supported by a spider 21. The container is fitted with a ram 22 which is acted upon by the hydraulic ram of the press (shown in Figure 1 only) to force lead in a plastic state out of the container 11 into the passage 13 in the die block 12 and through the annular orifice 23 between the matrix 14 and the external surface of the hollow point 16 to form a lead tube.

The point 16 and the point holder 17 are tubular. Within this point holder 17 is an inner point holder 24 terminating at its forward end in a combined inner die and spider 25 which co-operates with the tubular point 16 to form an annular injection orifice. The inner die and holder are apertured and serve to convey the conductor 26 through the outer point holder and position it centrally with respect to the extruded metal tube 27 (Figure 4). At its rear end the inner point holder is supported by a part 28 that is a sliding fit in the outer point holder 17 and its position with respect to the latter is adjustably controlled in an axial direction by means of a flanged bush 29 which is located between the part 28 and a flange 30 on the extremity of the holder and screws in the internally screw threaded rear end of the outer point holder 17. Rotation of the inner point holder is prevented by a pin 129 working in a groove in the part 28. The outer point holder 17 has at its rear end a lateral feed inlet 31 by which the material to be injected into the lead tube is fed under high pressure by means of the hydraulic press 2 (shown diagrammatically in Figure 1) to which it is connected by a pipe line 32. The press is supplied through a pipe line 33 from a heated feed vessel 34 in which the plastic is brought to a liquid condition and from which it is expelled by compressed nitrogen, the flow being controlled by a gas valve 134 and an outlet valve 133.

The cooling tube 3, which may have a length of about six feet or more, is jointed at its rear end to the outer die 14 and at intervals along its length is held in supports 35 secured to the upper face of a T-section girder 36 forming an elongated table. This table is supported at its front end by a pivot 37 and at its rear end, through the rear end of the cooling tube, by the die 14. This permits the cooling tube to follow, without bending, any lateral movement of the die 14, which in accordance with general practice is laterally adjustable on its seating. The cooling tube is externally screw threaded at each end and on these screw threaded portions 38a, 38b are screwed jackets 39a, 39b and pairs of rings 40a, 40b which serve to lock the jackets on the tube and, with the aid of packing washers 41a, 41b, to seal the joints between the jackets and tube. At these points the cooling tube is apertured to place its interior in communication with the interior of the jackets. The jacket 39b on the front end of the tube is fitted with a connecting tube 42b through which oil under pressure can be fed to the tube. A second connecting tube 43b serves to connect with a pressure gauge 44b. The other jacket 39a has a single connecting tube 42a through which oil can flow from the cooling tube, On the extremity of the screwed rear end 38a of the tube 3 is a connecting sleeve 45 which screws into the internally screw threaded wall of a recess in the outer face of the die 14 and makes a fluid-tight joint between the cooling tube and the die. On the front end of the tube is a sleeve 46 whose bore is such that it is a sliding fit on the lead sheathed conductor. On the end of this sleeve is fitted an outlet tank 47 having an outlet 48 for the issuing cable in alignment with the sleeve 46. Any pressure fluid leaking past the sleeve 46 is collected in the tank. The outlet is fitted with a felt wiping pad 49.

The hydraulic pumping apparatus, designated 4, comprises a motor driven pump 51 which draws oil from a reservoir 52 and delivers it at high presure to two pressure reducing valves 53a, 53b. From the valve 53a oil at an appropriate pressure is conveyed through a pipe line 54 to the hydraulic cylinder 55 of the press 2, suitable control valves 56 and 57 and a gauge 58 being inserted in the line. From the reducing valve 53b oil is fed at a suitable pressure controlled by a by-pass valve 59, through a pipe line 60 to the cooling tube 3. From the inlet 42b the pressure fluid flows along the clearance between the extruded lead tube and the wall of the cooling tube to the outlet 42a, abstracting heat from the lead tube and the plastic with which it is filled. From the outlet 42a, it is returned through a pipe line 61, fitted with a pressure gauge 62 and a control valve 63, which controls the rate of flow, to the reservoir 52 where it is cooled in any convenient manner such as by a refrigerating coil. Oil collecting in the outlet tank 47 is drained off into a vessel 64.

In operation the conductor 26 is drawn off from a supply reel 65 and fed into the lead press through the inner point holder 24, pressure is exerted by the ram 22 to force plastic lead through the extrusion orifice 23 to form a lead tube 27 which is pushed forward along the cooling tube, and pressure is exerted by the ram of the plastic press 2 to force liquid plastic along the annular passage between the inner and outer point holders and through the annular injection orifice into the space between the conductor and the lead tube. The internal pressure exerted on the lead tube is counteracted to a desired degree by the oil supplied under pressure to the cooling tube, which has access to the exterior of the extruded lead tube immediately it leaves the throat of the outer die 14. The rate of flow of oil, which is controlled independently of the pressure and its inlet temperature are so adjusted that the injected insulating fluid is set before the product emerges from the cooling tube to be taken up on a suitable take-up device shown diagrammatically at 66.

The radial clearance between the extruded tube and the wall of the cooling tube, which in this case forms the cable sheath, may be of the order of ten thousandths of an inch, so that the lead tube is centred with sufficient accuracy in the cooling tube. The surrounding oil film serves as a lubricant. In such a case the cooling tube may be internally fluted, for example, as shown in Figure 4, to ensure that a flow of oil sufficient for cooling can be maintained without difficulty. In this figure, the injected insulating material is shown as still fluid and is designated 67, the cooling oil surrounding the lead tube 27 being designated 68.

It will be understood that the lead press will be provided with heating or cooling means for bringing the lead to an appropriate extrusion temperature. Such means are well known however and need not be described. Naturally other known types of extrusion apparatus may be employed instead of a ram operated press shown. The second press will also be appropriately heated to maintain the insulating material in a fluid state, and the pipe lines for conveying the material from the supply tank to the press and from the tank to the outer point holder will be heated, as by a steam jacket, for instance.

What we claim as our invention is:

1. A method of manufacturing a conductor insulated with thermoplastic material, which comprises extruding a metal tube around the conductor to form a continuous mould enclosing the conductor with a large clearance between the conductor and the wall of the mold, filling the mould, as it is formed, by contiuously injecting the insulating material in a temporarily fluid state and under high pressure into it, reinforcing the mould against internal pressure for a distance from its formation point by surrounding it with a fluid medium under super-atmospheric pressure, and abstracting heat from the pressure-supported mould to cool and set the injected material therein.

2. A method of manufacturing a conductor insulated with thermoplastic material, which comprises extruding a metal tube around the conductor to form a continuous mould enclosing the conductor with a large clearance between the conductor and the wall of the mould, filling the mould, as it is formed, by continuously injecting the insulating material in a temporarily fluid state and under high pressure into it, surrounding the mould for a distance from its formation point with a fluid medium under super-atmospheric pressure to support it externally, and causing said fluid pressure medium to flow in the form of a thin annular stream surrounding the mould in a general direction counter to the direction of travel of the mould, whereby to abstract heat from the pressure-supported mould so as gradually to cool and set the injected material in the pressure-supported part of the mould.

3. A method of manufacturing a conductor insulated with thermoplastic material, which comprises extruding a metal tube around the conductor to form a continuous mould enclosing the conductor with a large clearance between the conductor and the wall of the mould, filling the mould, as it is formed, by continuously injecting the insulating material in a temporarily fluid state and under high pressure into it and abstracting heat from the mould to cool and set the insulating material therein by flowing an externally rigidly supported, thin annular film of oil under super-atmospheric pressure over the surface of the mould.

4. Apparatus for injection moulding a covering of thermoplastic insulating material on a conductor, comprising an extrusion device for the production of metal tubing having a laterally adjustable matrix and a point which co-operate to form an annular extrusion orifice, a tubular point holder for carrying the point, an inner point holder located within the tubular point holder and apertured for the through passage of the conductor to be covered, and a correspondingly apertured inner point supported by the inner point holder and co-operating with the tubular point to form an annular injection orifice for the injection of the thermoplastic covering material in a temporarily fluid state and under high pressure into the metal tubing, in combination with a tubular pressure-resistant casing for receiving the extruded metal tube issuing from the annular extrusion orifice, an elongated table for supporting said tubular casing, a pivotal support for said table at the front end thereof, means for making a fluid-tight joint between the matrix and the rear end of the tubular casing, means for supporting the rear end of the table from the rear end of the tubular casing coupled to the matrix, and means for supplying said tubular casing with fluid under pressure for supporting the extruded metal tube externally as it passes therethrough.

5. A method of manufacturing a conductor insulated with thermoplastic material, which comprises extruding a metal tube around the conductor to form a continuous mould enclosing the conductor with a large clearance between the conductor and the wall of the mould, filling the mould, as it is formed, by continuously injecting the insulating material in a temporarily fluid state and under high pressure into it, cooling the sheath to set the injected material therein and reinforcing it against internal pressure by surrounding it by fluid under super-atmospheric pressure and until the injected material has set maintaining the conductor and the sheath in substantial alignment with one another by maintaining the conductor under tension and applying continuous close support to the sheath.

6. A method of manufacturing a conductor insulated with thermoplastic material, which comprises extruding a metal tube around the conductor to form a continuous mould enclosing the conductor with a large clearance between the conductor and the wall of the mould, filling the mould, as it is formed, by continuously injecting the insulating material in a temporarily fluid state and under high pressure into it, cooling the sheath to set the injected material and until the injected material therein has set reinforcing the sheath against internal pressure by surrounding it by fluid under super-atmospheric pressure while continuously positively limiting its movement in all lateral directions.

7. Apparatus for injection moulding a covering of thermoplastic material on a conductor, comprising an extrusion device for the production of metal tubing having a laterally adjustable matrix and a point which cooperate to form an annular extrusion orifice, a tubular point holder for carrying the point, means for guiding the conductor to be covered into and through the tubular point holder and its point, and means for supplying thermoplastic material in a temporarily fluid state and under high pressure to the interior of said point holder, in combination with a tubular pressure-resistant casing for receiving the extruded metal tube issuing from the annular extrusion orifice, an elongated table for supporting said tubular casing, a pivotal support for said table at the front end thereof, means for making a fluid-tight joint between the matrix and the rear end of the tubular casing, means for supporting the rear end of the table from the rear end of the tubular casing coupled to the matrix, and means for supplying said tubular casing with fluid under pressure for supporting the extruded metal tube externally as it passed therethrough.

DOUGLAS CHARLES HANCOCK.
HERMANN RICHARD LORCH.

REFERENCES CITED

The following references are of record in the file of this patent:

UNITED STATES PATENTS

| Number | Name | Date |
| --- | --- | --- |
| 1,770,985 | Kivley | July 22, 1930 |
| 2,121,966 | Jacobson | June 28, 1938 |
| 2,371,709 | Rineer | Mar. 20, 1945 |
| 2,384,224 | Williams | Sept. 4, 1945 |
| 2,401,642 | Hiltner et al. | June 4, 1946 |